June 19, 1923.
N. GREISCH
DEMOUNTABLE RIM FASTENER
Filed July 15, 1922
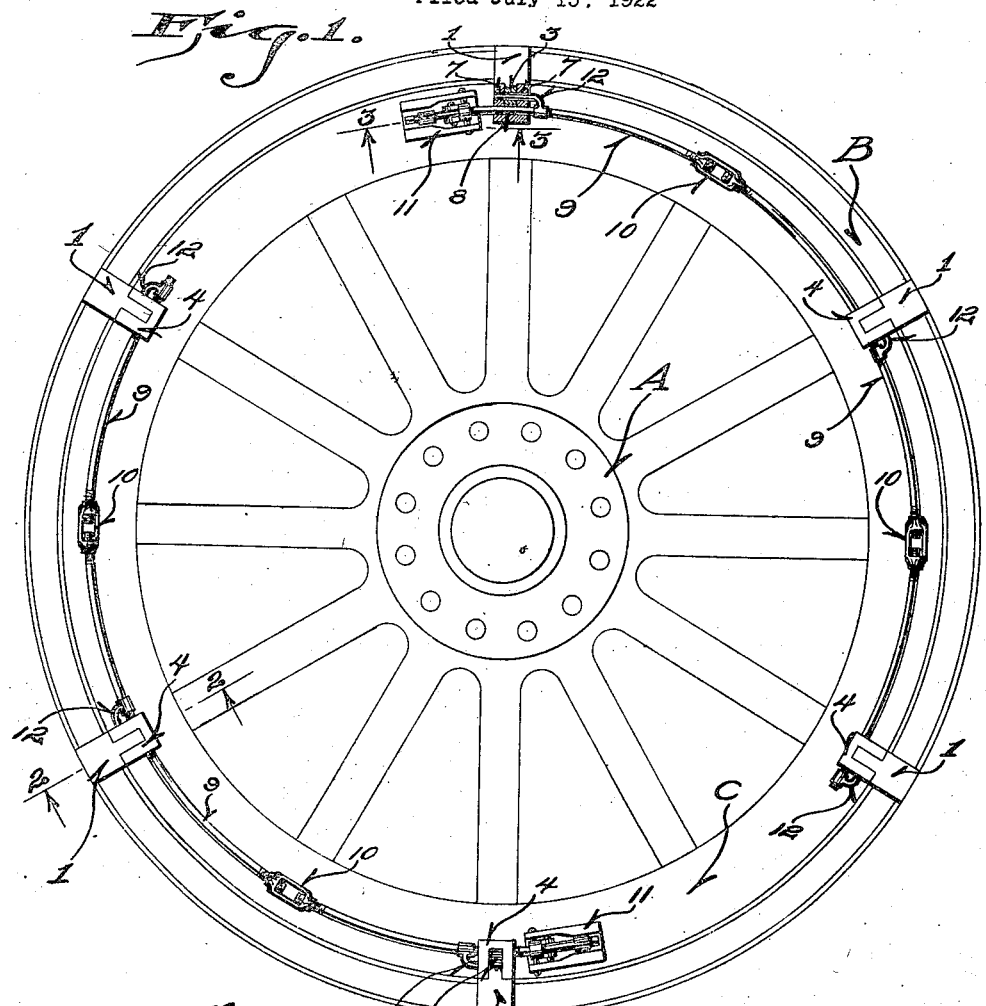
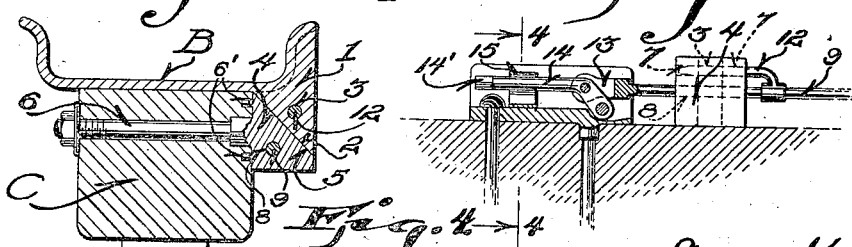
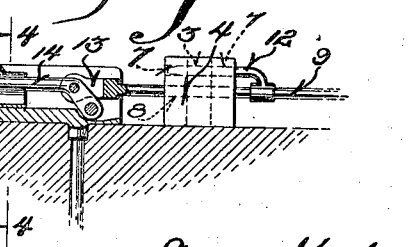
Inventor,
Nicholas Greisch
Witness,
Erwin B. Eiring
By
Attorneys Patented June 19, 1923.

1,459,204

UNITED STATES PATENT OFFICE.

NICHOLAS GREISCH, OF MILWAUKEE, WISCONSIN.

DEMOUNTABLE-RIM FASTENER.

Application filed July 15, 1922. Serial No. 575,147.

*To all whom it may concern:*

Be it known that I, NICHOLAS GREISCH, a citizen of the United States, and resident of Milwaukee, in the county of Milwaukee and State of Wisconsin, have invented certain new and useful Improvements in Demountable-Rim Fasteners; and I do hereby declare that the following is a full, clear, and exact description thereof.

My invention refers to quickly detachable wheel rims for vehicle tires, and it has for its primary object to provide a simple, economical and effective means for attaching a rim to the wheel, having a manually actuated series of plungers for unlocking the separable parts, whereby the tedious work of actuating a series of bolts and nuts to effect the attachment is eliminated.

Other objects of my invention are:

To provide locking means between a rim and wheel so constructed and arranged that by a simple lever action said parts are secured together.

To provide the rim and wheel with intermeshed correspondingly apertured lugs and series of connected, manually operated plungers for engagement with the lugs, whereby the parts are simultaneously locked.

With the above and other minor objects in view, the invention consists in certain peculiarities of construction and operation of parts, as will be hereinafter explained with reference to the accompanying illustrations and subsequently claimed.

In the drawings:

Figure 1 represents a face view of a wheel, having fitted thereto a detachable rim provided with locking means embodying the features of my invention, the parts being broken away and in section to clearly illustrate the structural features.

Figure 2 is an enlarged detailed cross section of the rim and wheel, illustrating a set of meshing locking lugs, constituting one of the features of my invention, the section being indicated by line 2—2 of Figure 1.

Figure 3 is an enlarged sectional view, as indicated by line 3—3 of Figure 1, showing means for simultaneously actuating a series of locking plungers associated with rim and wheel lugs, and Figure 4 is a detail cross section through the locking means, the section being indicated by line 4—4 of Figure 3.

Referring by characters to the drawings, A represents a wheel of the military spoked type, and B represents a standard detachable rim, which rim is fitted to the felly C of the wheel in the ordinary manner. It is understood that, while I have illustrated a military wheel and one type of detachable rim, my invention can be as readily applied to wire wheels, or to what is known to the trade as metallic disc wheels.

The outer face of the rim B is provided with a series of inwardly extended lugs 1, having inner beveled contact faces 2. These lugs may be brazed or riveted to the wheel rim, or, in some cases, they may be an integral part thereof. The lugs 1 are suitably spaced apart throughout the circumference of the wheel rim and are provided with plunger apertures 3, which apertures are circumferentially alined. Projecting from the felly C of the wheel are a series of radially disposed lugs 4, which lugs are in the form of jaws having central recesses 5, the base of each of which is beveled to conform to the beveled face of its companion rim lug 1. The wheel lugs, as exemplified, are secured to the felly C by bolts 6 and dowel pins 6', whereby said lugs are held against movement in all directions.

Obviously, when the wheel is all of metal, or when it is formed with a metallic felly, the associated lugs 4 may form an integral part thereof, or they may be riveted or otherwise secured. The wheel lugs, as best shown in Figure 1, are provided with plunger apertures 7, which apertures are alined with the rim lug apertures, when the parts are assembled. The wheel lugs are, also, formed with guide apertures 8 for the reception of a link-rod 9, which link-rod is shown extended approximately throughout half of the circumference of the wheel and is formed in sections connected by turn-buckles 10, this separable construction being for the purpose of adjustment, assemblage, and cheapness in manufacture.

There are, as shown, two units of the link-rod, each of which is provided with an actuating mechanism, each of which mechanisms is mounted in a housing block 11. The housing block is, as best shown in Figure 3, bolted or otherwise secured to the wheel felly and it follows that where metallic wheels are employed, this block can be an integral part thereof. Extending from each link-rod are a series of locking plungers 12, which plungers, when the rim and wheel are assembled, engage the apertures of the meshing lugs, whereby the series of wheel and rim lugs are firmly fastened.

One end of each link-rod is formed with apertured ears 13, which extend within the housing block, and a manually controlled locking lever 14, which is within the housing block and is also pivotally connected to the link-rod 9. The outer end of the locking lever is formed with a squared head 14' for the reception of the socketed head of a locking lever extension rod, (not shown.) This extension rod is simply fitted over the head, whereby the locking lever is increased in length to facilitate easy manipulation, whereby when the lever is swung in one direction, it will cause the circumferential link-rod 9 to slide in its lug bearings and thereby disengage the plungers to free the rim from engagement with the wheel.

When the locking lever is moved in the opposite direction, it follows that its plungers, in engaging the nested and alined lug apertures, will lock the same together, whereby the wheel and rim are, in effect integral elements. When the locking lever is depressed in its normal locked position, as indicated in Figure 3, its shank portion is frictionally gripped by a spring clip 15, whereby the parts are held against movement and, also, prevented from rattling.

From the foregoing description it will be readily seen that when it is desired to disconnect a rim from the wheel, an outward swing of the locking levers will free the plungers, whereby the associated series of rim and wheel lugs will be disconnected, and by manipulating the opposite group of plungers in a similar manner, the rim can thereafter be readily removed. Briefly stated, the operator simply has to make two movements, whereby the rim is entirely disconnected, or connected, as the case may be, and such movements only require slight expenditure of power, and hence a wheel rim can be adjusted to the wheel, or removed therefrom, by anyone unskilled in the art of using tools, in the same time in which it would ordinarily require to turn up a single bolt.

While I have shown and described a practical exemplification of my invention minutely, with respect to all structural features, it is understood that I may vary the structural features within the knowledge of the skilled mechanic, or as called for in the claims, without departing from the spirit of my invention.

I claim:—

1. In a wheel having a detachable rim; the combination of means for locking the rim to the wheel including radially disposed apertured lugs depending from one face of the rim, companion apertured lugs extending from one face of the wheel for meshed engagement with the rim lugs, a series of connected plungers carried by the wheel for locking engagement with the rim and wheel lugs, and manually controlled means associated with a series of the plungers, whereby groups of the same are simultaneously actuated.

2. In a wheel having a detachable rim; the combination of means for locking the rim and wheel including radially disposed apertured lugs extending from the rim, companion apertured lugs extending from the wheel for meshed engagement with the rim lugs, a series of plungers mounted reciprocatively in the lug apertures of the wheel, link-rods connecting a series of plungers, and a lever mechanism connected to the link-rod for moving the same, whereby a connected series of the plungers are simultaneously actuated.

In testimony that I claim the foregoing I have hereunto set my hand at Milwaukee, in the county of Milwaukee and State of Wisconsin.

NICHOLAS GREISCH.